United States Patent Office 3,413,945
Patented Dec. 3, 1968

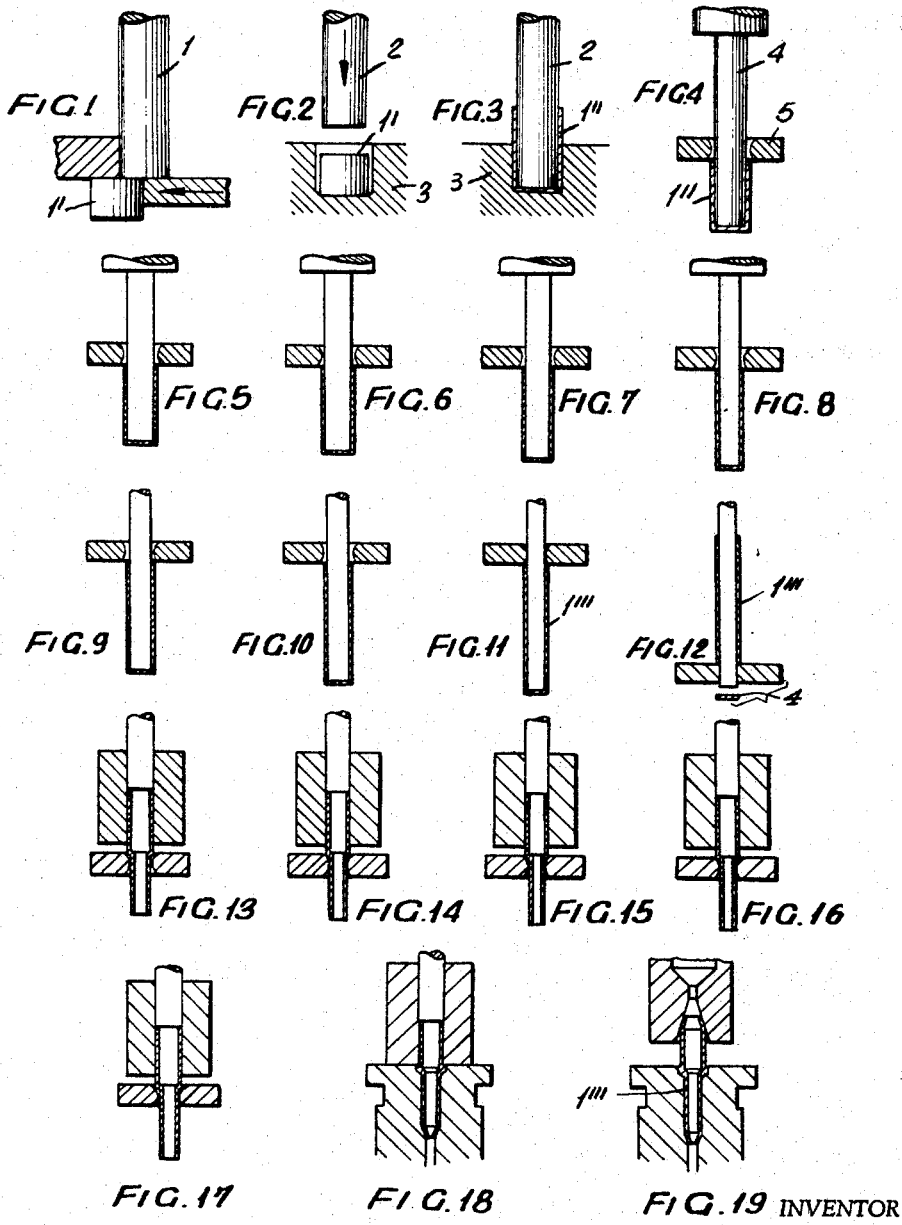

3,413,945
PROCESS FOR MANUFACTURING POINTS
FOR BALL-POINT PENS
Guido Bertoglio, Lugano-Viganello, Ticino, Switzerland, assignor to Real Patentauswertung Anstalt, Vaduz, Liechtenstein
Filed Apr. 25, 1966, Ser. No. 545,134
Claims priority, application Switzerland, May 11, 1965, 6,662/65
3 Claims. (Cl. 113—32)

ABSTRACT OF THE DISCLOSURE

A process for manufacturing points for ball-point pens comprises cutting off from cylindrical stock a short cylindrical blank whose height-to-width ratio is about 1:1, and then performing a single cold extrusion step on the blank in a female die whose internal diameter is greater than the external diameter of the blank, so as to form a cup whose bottom and side walls are of about equal thickness. Thereafter, the cup is lengthened and reduced in diameter while maintaining the thickness of the bottom and side walls substantially unchanged, until an elongated blind bottom tube is produced. The bottom is cut from the tube so that the tube is open at both ends, and then the open-ended tube is shaped to the form of a point for a ball-point pen.

---

The object of this invention is to provide a process for the manufacturing of points for ball-point pens without appreciable waste of material, starting from a small solid bar or from a wire, characterized by the following operations:

rough small cylinders are successively cut off from a small solid bar or wire, one for each point to be manufactured;
each small cylinder is transformed by a cold extrusion process, into a cup having the thickness of the walls equal to the thickness of the bottom and the inner diameter long enough so as to assure to the tool, which has performed the extrusion, the necessary mechanical resistance;
the cup obtained with this method undergoes successive phases of pressing through a constriction, causing in this way its lengthening and reducing gradually diameter, still keeping the same thickness of the walls and of the bottom, until the cup is transformed into a small blind bottom tube;
the bottom is then cut off and the reduction of the small tube is continued with successive pressings in order to give to it the final form of a point for a ball-point pen.

The process of the present invention differs markedly from the known processes for the cold pressing of points for ball-point pens.

In fact a cold pressing process is known, which permits obtaining the finished point starting from a metallic strip, cutting off from said strip small discs, one for each point, and pressing in successive phases of cold pressing the small disc, so as to transform it first into a small blind bottom tube and then into the point of the desired ball-point pen. The disadvantage of this process consists in the fact that, when cutting off from the metallic strip, which is rectangular, a disc, which is circular, a remarkable quantity of material (nearly 35%) is wasted at the edges of the strip, said material remaining completely unutilized.

Since at present the mass production cost of the point by using special high production machines has been cut down to a minimum, a large waste of material causes a remarkable increase of the cost and therefore, even if the said process is undoubtedly interesting from a technical point of view, it cannot compete with the process of the present invention.

Another manufacturing process for points for ball-point pens, being the subject of a patent of the same applicant, is characterized in that the manufacturing is performed by means of extrusion, starting from a wire of a diameter almost equal to that of the point to be manufactured and extruding it completely in all its parts with cold extrusion.

Said process which does not cause any waste of material is compelled, however, to use tools made of special very resistant material, liable to frequent breakages with relative loss of production and high cost of tools so that the final cost is also higher.

The process of the present invention can be considered a combination of the above cited processes and, while eliminating completely the inconveniences of the same, still maintains and even increases the advantages.

For a better explanation the enclosed drawing shows schematically from FIGS. 1 to 19 the various phases of the process of the present invention.

FIG. 1 shows a small starting bar 1 made out of brass or any other suitable material, the diameter of which is remarkably larger than that of the point for ball-point pens which is to be obtained (compare with FIG. 19).

From this small bar a small cylinder 1' is cut off in any known way and goes through the successive phases of work illustrated in FIGS. 2–3.

At this point a cold extrusion is performed by using the tool 2 and the forming-die 3. The extrusion is easily performed because the ratio between the diameter and the height of the small cylinder 1" to be extruded is nearly equal to 1. This ratio permits an acceptable elongation along tool 2.

The small cylinder 1' is in this way transformed into a cup 1" with an inner diameter corresponding to the outer diameter of the tool 2, having however the thickness of the walls and the thickness of the bottom equal to each other, as though the cup had been obtained by pressing from one sheet.

The cup 1" has therefore, in comparison to the finished point of FIG. 19, a diameter very much larger and a height very much smaller although having the thickness of the walls and the thickness of the bottom already equal to that of the finished point indicated at 1" in FIG. 19.

The cup 1" is made to go through successive dies and counter-dies, dies which do not operate any more by means of extrusion, but by means of constricting in successive phases shown from FIG. 4 to FIG. 11.

In these successive pressings the diameter of the cup is gradually reduced so as to transform said cup into a small blind bottom tube 1'" (see FIG. 11).

The thickness of the walls and of the bottom of this small tube is equal to that of cup 1" (FIG. 3).

Summarizing:
In the operations of FIGS. 2–3 the work has been performed by means of "cold extrusion," i.e. starting from a small solid cylinder the same has been transformed into a capsule with thin walls and bottom, while during operations shown from FIG. 4 to FIG. 11 the work is performed by means of constricting, i.e. through stretching or rather lengthening, still maintaining constant the thickness of the walls.

FIG. 12 shows the operation of cutting off the bottom of the small tube 1'", said bottom being indicated at 4 and representing a very negligible waste of material compared to the material forming the small tube 1'".

In the dies of FIG. 13 to 19 the pressing by means of constricting is continued as to give gradually to the small tube the final shape illustrated in FIG. 19.

As shown in FIG. 19, the small tube has come to the final shape of the point, which was to be obtained, and its lower extremity is shaped in such a way as to be successively processed in order to receive the ball.

It is understood that the points obtained with the described process are also objects of the present invention.

What is claimed is:

1. A process for manufacturing points for ball-point pens, comprising cutting off from a solid elongated cylindrical length of metal a short cylinder, cold extruding said short cylinder to a cup in a female die whose internal diameter is greater than the initial external diameter of said short cylinder, progressively elongating and reducing the external diameter of said cup through a series of dies while maintaining the wall thickness of the cup substantially unchanged until an elongated blind bottom tube is produced, cutting off the blind bottom of the tube to produce a tube open at both ends, and shaping said tube open at both ends to the form of a point for a ball-point pen.

2. A process as claimed in claim 1, the height and width of said short cylinder being about equal to each other.

3. A process as claimed in claim 1, the wall thickness of said cup being about equal to the thickness of the bottom of said cup.

References Cited

UNITED STATES PATENTS

| | | | |
|---|---|---|---|
| 1,151,222 | 8/1915 | Scrimgeous | 72—348 |
| 2,930,483 | 3/1960 | Kaul | 72—377 |
| 2,969,030 | 1/1961 | Kahn et al. | 113—32 |
| 3,078,566 | 2/1963 | Egan | 72—339 |
| 3,209,453 | 10/1965 | Bertoglio et al. | 72—358 |
| 3,264,853 | 8/1966 | Huber | 72—352 |

CHARLES W. LANHAM, *Primary Examiner.*

L. A. LARSON, *Assistant Examiner.*